United States Patent
Baumgart et al.

(10) Patent No.: US 9,279,445 B2
(45) Date of Patent: Mar. 8, 2016

(54) DROPLET GENERATOR STEERING SYSTEM

(75) Inventors: Peter M. Baumgart, San Diego, CA (US); J. Martin Algots, San Diego, CA (US); Abhiram Govindaraju, San Diego, CA (US); Chirag Rajyaguru, San Diego, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 13/328,628

(22) Filed: Dec. 16, 2011

(65) Prior Publication Data

US 2013/0153792 A1  Jun. 20, 2013

(51) Int. Cl.
| | |
|---|---|
| *A61N 5/00* | (2006.01) |
| *F16C 11/12* | (2006.01) |
| *H05G 2/00* | (2006.01) |
| *G21K 5/00* | (2006.01) |
| *G21K 5/08* | (2006.01) |

(52) U.S. Cl.
CPC ............... *F16C 11/12* (2013.01); *H05G 2/005* (2013.01); *H05G 2/006* (2013.01); *G21K 5/00* (2013.01); *G21K 5/08* (2013.01); *Y10T 403/54* (2015.01)

(58) Field of Classification Search
CPC .............. B05B 1/02; B05B 1/28; B05B 1/30; G21K 5/00; A61N 5/06; H05G 2/006; G03F 7/70033; Y10T 403/54
USPC ......... 248/550, 636, 581, 583, 591, 605, 560, 248/580, 610, 317; 250/492.2, 493.1, 250/504 R; 239/102.1, 102.2; 378/119, 143, 378/144; 403/291
See application file for complete search history.

(56) References Cited

U.S. PATENT DOCUMENTS

| | | | | |
|---|---|---|---|---|
| 2,880,950 | A | * 4/1959 | Williams et al. | 248/102 |
| 4,535,405 | A | 8/1985 | Hill et al. | |
| 5,169,112 | A | * 12/1992 | Boyles et al. | 248/550 |
| 5,986,827 | A | 11/1999 | Hale | |
| 6,022,005 | A | * 2/2000 | Gran et al. | 248/550 |
| 6,099,217 | A | * 8/2000 | Wiegand et al. | 409/201 |
| 6,113,188 | A | * 9/2000 | Stewart et al. | 297/339 |
| 6,170,367 | B1 | 1/2001 | Keller et al. | |
| 6,240,799 | B1 | * 6/2001 | Yau | 74/490.03 |
| 6,598,837 | B1 | * 7/2003 | Howard et al. | 248/103 |
| 6,792,076 | B2 | 9/2004 | Petach et al. | |

(Continued)

FOREIGN PATENT DOCUMENTS

WO    WO 2006/014946 A3    2/2006

OTHER PUBLICATIONS

International Search Report and Written Opinion in counterpart application PCT/US2012/066121 dated Feb. 5, 2013.

(Continued)

*Primary Examiner* — Tan Le
(74) *Attorney, Agent, or Firm* — Arent Fox LLP

(57) ABSTRACT

Steering system for a droplet generator in a EUV system. The steering system permits controlled positioning of a droplet release point of the droplet generator. A movable member holding the droplet generator is coupled to stationary elements of the EUV system through a coupling system having a first subsystem that constrains lateral translation of the movable member, and a second subsystem that controls a relative inclination of the movable member. The first and second subsystems preferably include one or a combination of flexures that permit highly precise and repeatable positioning.

18 Claims, 9 Drawing Sheets

(56) References Cited

U.S. PATENT DOCUMENTS

| | | | |
|---|---|---|---|
| 6,976,821 B2* | 12/2005 | Zarske | 409/201 |
| 7,124,660 B2* | 10/2006 | Chiang | 74/490.05 |
| 7,275,332 B2* | 10/2007 | Blanding | 248/178.1 |
| 7,398,790 B2 | 7/2008 | Glatz | |
| 2003/0116642 A1 | 6/2003 | Williams et al. | |
| 2004/0189969 A1 | 9/2004 | Mizuno | |
| 2005/0205810 A1 | 9/2005 | Akins et al. | |
| 2008/0216286 A1 | 9/2008 | Bertele et al. | |
| 2009/0230326 A1* | 9/2009 | Vaschenko et al. | 250/492.2 |
| 2010/0294958 A1 | 11/2010 | Hayashi et al. | |
| 2012/0104210 A1* | 5/2012 | Booth | 248/311.2 |
| 2012/0152877 A1* | 6/2012 | Tadayon | 212/224 |

OTHER PUBLICATIONS

Extended European Search Report of European Patent Application No. 12858121.2 dated Jul. 24, 2015.

* cited by examiner

DROPLET GENERATOR STEERING SYSTEM

BACKGROUND

1. Field

The present disclosure relates to extreme ultraviolet ("EUV") light sources that provide EUV light from plasma created by converting a target material.

2. Background

Extreme ultraviolet light, e.g., electromagnetic radiation having wavelengths of around 50 nm or less (also sometimes referred to as soft x-rays), and including light at a wavelength of about 13.5 nm, can be used in photolithography processes to produce extremely small features in substrates such as silicon wafers.

Methods for generating EUV light include converting a target material from a liquid state into a plasma state. The target material preferably includes at least one element, e.g., xenon, lithium or tin, with one or more emission lines in the EUV range. In one such method, often termed laser produced plasma ("LPP") the required plasma can be produced by irradiating a target material having the required line-emitting element with a laser beam.

One LPP technique involves generating a stream of target material droplets and irradiating at least some of the droplets with laser light pulses. In more theoretical terms, LPP light sources generate EUV radiation by depositing laser energy into a target material having at least one EUV emitting element, such as xenon (Xe), tin (Sn) or lithium (Li), creating a highly ionized plasma with electron temperatures of several 10's of eV.

The energetic radiation generated during de-excitation and recombination of these ions is emitted from the plasma in all directions. In one common arrangement, a near-normal-incidence mirror (often termed a "collector mirror") is positioned to collect, direct (and in some arrangements, focus) the light at an intermediate location, e.g., a focal point. The collected light may then be relayed from the intermediate location to a set of scanner optics and ultimately to a wafer.

In quantitative terms, one arrangement that is currently being developed with the goal of producing about 100 W at the intermediate location contemplates the use of a pulsed, focused 10-12 kW $CO_2$ drive laser which is synchronized with a droplet generator to sequentially irradiate about 10,000-200,000 tin droplets per second. For this purpose, there is a need to produce a stable stream of droplets at a relatively high repetition rate (e.g., 10-200 kHz or more). There is also a need to deliver the droplets to an irradiation site with high accuracy and good repeatability in terms of timing and position over relatively long periods of time. To ensure positional accuracy and repeatability, it is necessary to provide a high precision steering system that can release droplets from a range of positions to compensate for other systemic variations, for example, in laser targeting and timing. In this context, the term "steer" includes the concept of varying the position of the release point in at least two dimensions, i.e, with two angular degrees of freedom. It is also desirable to provide a steering system that is high bandwidth and that exhibits high stiffness with little or no hysteresis.

Design of a steering system meeting these criteria must also take into account that the droplet generator itself may be relatively massive, for example, on the order of 30 kg. The steering system also preferably operates over a relatively large range of angles, for example, with an actuation range of at least +1-2 degrees. Also, design considerations impose about a 1 micron requirement for position control of the droplets at the plasma location. This imposes a need for micro-radian level precision for the steering system.

With the above in mind, applicants disclose systems for steering a droplet generator.

SUMMARY

The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

In one aspect, the invention is an apparatus including a first member adapted to be coupled to a frame, a second member adapted to receive a droplet generator, and a coupling system mechanically coupling the first member to the second member, wherein the coupling system may include a first coupling subsystem configured to constrain lateral movement between the first member and the second member, and a second coupling subsystem adapted to control an inclination of the second member with respect to the first member. The first coupling subsystem may include a plurality of first coupling subsystem elements mechanically coupling the first member to the second member. Each of the first coupling subsystem elements may include least one flexure, which may be a string flexure. In the case of a first member that is substantially plate-shaped, the string flexure may be oriented substantially parallel to the first member.

The second coupling subsystem may include a plurality of second coupling subsystem elements mechanically coupling the first member to the second member. Each of the second coupling subsystem elements may include at least one first flexure which may be a cartwheel flexure. Each of the second coupling subsystem elements may also include at least one second flexure coupled to the at least one first flexure. The at least one second flexure may be a parallelogram flexure. Each of the second coupling subsystem elements may also include at least one linear motor coupled to the first member and to the first flexure.

Each of the second coupling subsystem elements may also include at least one second flexure coupled to the at least one first flexure. Each of the second coupling subsystem elements may also include at least piezoelectric element coupled to the second member and to the at least one second flexure.

In another aspect, the invention is an apparatus including a plate-shaped first member adapted to a coupled to a frame, a plate-shaped second member adapted to receive a droplet generator; and a coupling system mechanically coupling the first member to the second member, wherein the coupling system may include a first coupling subsystem configured to constrain lateral movement between the first member and the second member, the first coupling subsystem including a plurality of first coupling subsystem elements, each of the first coupling subsystem elements comprising at least one flexure, and a second coupling subsystem adapted to control inclination of the second member with respect to the first member, the first coupling subsystem including a plurality of first coupling subsystem elements, each of the first coupling subsystem elements comprising at a linear combination of a stepper motor coupled to the first member, a first flexure coupled to the stepper motor, a second flexure coupled to the first flexure, and a piezoelectric actuator coupled to the second flexure and to the second member.

In yet another aspect, the invention is an apparatus including a first member adapted to a coupled to a frame, a second member adapted to receive a droplet generator; and a coupling system mechanically coupling the first member to the second member, wherein the coupling system may include at least one flexure.

In still another aspect, the invention is an apparatus including a source adapted to produce a target of a material in a liquid state and a laser adapted to irradiate the target to change a state of the material from the liquid state to a plasma state to produce EUV light in an irradiation region. The apparatus also includes an optical system adapted to convey the EUV light from the irradiation region to a workpiece. The source includes a target generator and a target generator steering system coupled to the target generator, the target generator steering system including a first member adapted to be fixed relative to the irradiation region, a second member adapted to receive the target generator and adapted to be movable with respect to the irradiation region; and a coupling system mechanically coupling the first member to the second member, wherein the coupling system may include at least one flexure.

In still another aspect, the invention is a product made using an apparatus including a source adapted to produce a target of a material in a liquid state, a laser adapted to irradiate the target to change a state of the material from the liquid state to a plasma state to produce EUV light in an irradiation region, and an optical system adapted to convey the EUV light from the irradiation region to a workpiece. The source includes a target generator and a target generator steering system coupled to the target generator, the target generator steering system including a first member adapted to be fixed relative to the irradiation region, a second member adapted to receive the target generator and adapted to be movable with respect to the irradiation region; and a coupling system mechanically coupling the first member to the second member, wherein the coupling system may include at least one flexure.

DETAILED DESCRIPTION

Figure 1:
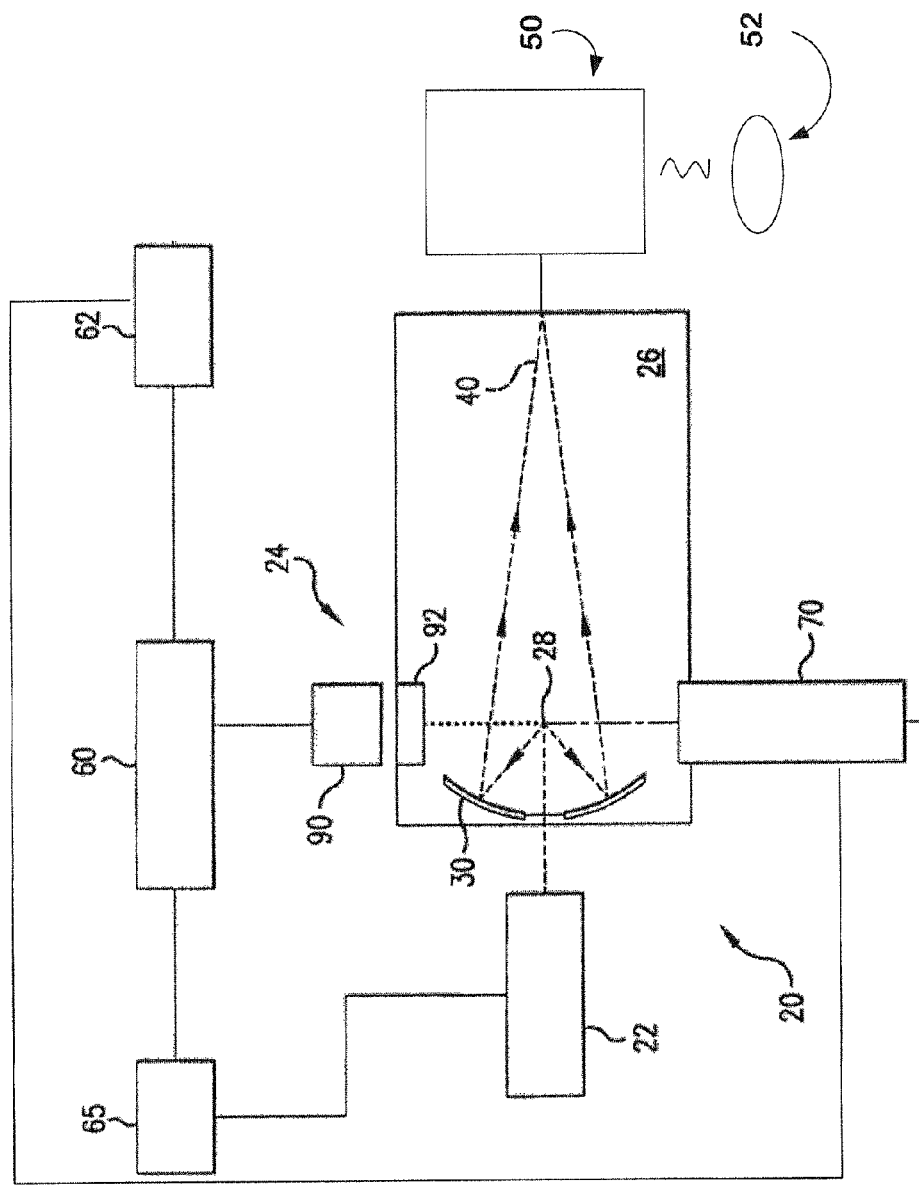
FIG. 1 shows a schematic, not to scale, view of an overall broad conception for a laser-produced plasma EUV light source system according to an aspect of the present invention.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments.

With initial reference to FIG. 1 there is shown a schematic view of an exemplary EUV light source, e.g., a laser produced plasma EUV light source 20 according to one aspect of an embodiment of the present invention. As shown, the EUV light source 20 may include a pulsed or continuous laser source 22, which may for example be a pulsed gas discharge $CO_2$ laser source producing radiation at 10.6 µm. The pulsed gas discharge $CO_2$ laser source may have DC or RF excitation operating at high power and high pulse repetition rate. For example, a suitable $CO_2$ laser source having a MO-PA1-PA2-PA3 configuration is disclosed in. U.S. Pat. No. 7,439,530, issued Oct. 21, 2008, and entitled, LPP EUV LIGHT SOURCE DRIVE LASER SYSTEM, the entire contents of which are hereby incorporated by reference herein.

Depending on the application, other types of lasers may also be suitable. For example, a solid state laser, an excimer laser, a molecular fluorine laser, a MOPA configured excimer laser system, e.g., as shown in U.S. Pat. Nos. 6,625,191, 6,549,551, and 6,567,450, an excimer laser having a single chamber, an excimer laser having more than two chambers, e.g., an oscillator chamber and two amplifying chambers (with the amplifying chambers in parallel or in series), a master oscillator/power oscillator (MOPO) arrangement, a power oscillator/power amplifier (POPA) arrangement, or a solid state laser that seeds one or more $CO_2$, excimer or molecular fluorine amplifier or oscillator chambers, may be suitable. Other designs are possible.

The EUV light source 20 also includes a target delivery system 24 for delivering target material in the form of liquid droplets or a continuous liquid stream. The target material may be made up of tin or a tin compound, although other materials could be used. The target delivery system 24 introduces the target material into the interior of a chamber 26 to an irradiation region 28 where the target material may be irradiated to produce a plasma. In some cases, an electrical charge is placed on the target material to permit the target material to be steered toward or away from the irradiation region 28. It should be noted that as used herein an irradiation region is a region where target material irradiation may occur, and is an irradiation region even at times when no irradiation is actually occurring.

Continuing with FIG. 1, the light source 20 may also include one or more optical elements such as a collector 30. The collector 30 may be a normal incidence reflector, for example, a SiC substrate coated with a Mo/Si multilayer with additional thin barrier layers deposited at each interface to effectively block thermally-induced interlayer diffusion, in the form of a prolate ellipsoid, with an aperture to allow the laser light to pass through and reach the irradiation region 28. The collector 30 may be, e.g., in the shape of a ellipsoid that has a first focus at the irradiation region 28 and a second focus at a so-called intermediate point 40 (also called the intermediate focus 40) where the EUV light may be output from the EUV light source 20 and input to, e.g., an integrated circuit lithography tool 50 which uses the light, for example, to process a silicon wafer workpiece 52 in a know manner. The silicon wafer workpiece 52 is then additionally processed in a known manner to obtain an integrated circuit device.

The EUV light source 20 may also include an EUV light source controller system 60, which may also include a laser firing control system 65, along with, e.g., a laser beam positioning system (not shown). The EUV light source 20 may also include a target position detection system which may include one or more droplet imagers 70 that generate an output indicative of the absolute or relative position of a target droplet, e.g., relative to the irradiation region 28, and provide this output to a target position detection feedback system 62. The target position detection feedback system 62 may use this output to compute a target position and trajectory, from which a target error can be computed. The target error can be computed on a droplet-by-droplet basis, or on average, or on some other basis. The target error may then be provided as an input to the light source controller 60. In response, the light source controller 60 can generate a control signal such as a laser position, direction, or timing correction signal and provide this control signal to a laser beam positioning controller (not shown). The laser beam positioning system can use the control signal to control the laser timing circuit and/or to control a laser beam position and shaping system (not shown), e.g., to change the location and/or focal power of the laser beam focal spot within the chamber 26.

As shown in FIG. 1, the light source 20 may include a target delivery control system 90. The target delivery control system 90 is operable in response to a signal, for example, the target error described above, or some quantity derived from the target error provided by the system controller 60, to correct for errors in positions of the target droplets within the irradiation region 28. This may be accomplished, for example, by repositioning the point at which the target delivery mechanism 92 releases the target droplets.

Figure 2:
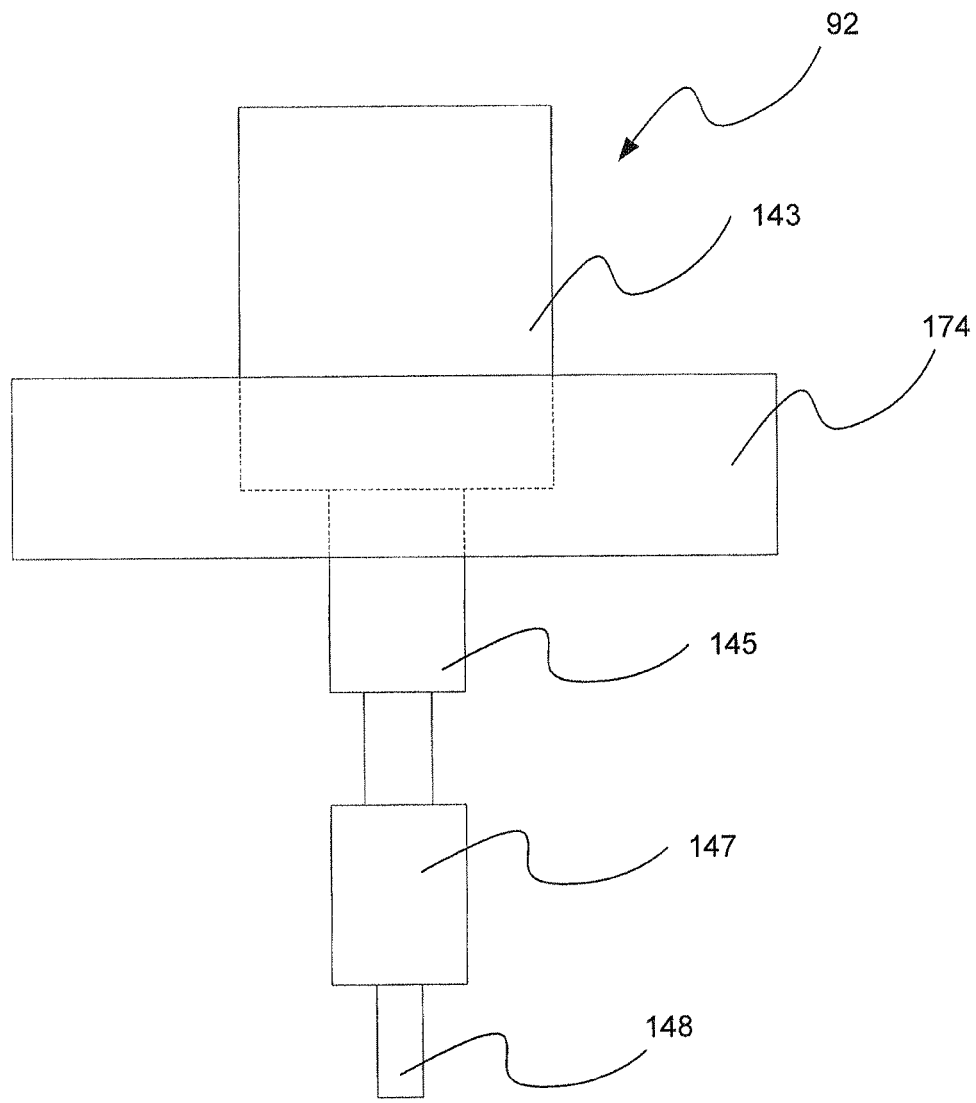
FIG. 2 shows a schematic, not to scale, view of a droplet generator for creating droplets of a source material.

FIG. 2 shows in greater detail a target delivery mechanism 92 for delivering targets of source material having into a chamber 26. The target delivery system 92 is described in general terms herein because the features and advantages of the invention are independent of the specific details of implementation of the target delivery system 92. For the generalized embodiment shown in FIG. 2, the target delivery mechanism 92 may include a cartridge 143 holding a molten source material such as tin. The molten source material may be placed under pressure by using an inert gas such as argon. The pressure preferably forces the source material to pass through a set of filters 145. From the filters 145, the source material may pass through an open/close thermal valve 147 to a dispenser 148. For example a Peltier device may be employed to establish the valve 147, freezing source material between the filters 145 and dispenser 148 to close the valve 147 and heating the frozen source material to open the valve 147. FIG. 2 also shows that the target delivery system 92 is coupled to a movable member 174 such that motion of the movable member 174 changes the position of the point at which droplets are released from the dispenser 148 in a manner that is described more thoroughly below.

For the mechanism 92, one or more modulating or non-modulating source material dispenser(s) 148 may be used. For example, a modulating dispenser may be used having a capillary tube formed with an orifice. The dispenser 148 may include one or more electro-actuatable elements, e.g. actuators made of a piezoelectric material, which can be selectively expanded or contracted to deform the capillary tube and modulate a release of source material from the dispenser 148. As used herein, the term "electro-actuatable element" and its cognates mean a material or structure which undergoes a dimensional change when subjected to a voltage, electric field, magnetic field, or combinations thereof and includes, but is not limited to, piezoelectric materials, electrostrictive materials, and magnetostrictive materials. A heater may be used to maintain the source material in a molten state while passing through the dispenser 148. Examples of modulating droplet dispensers can be found in U.S. Pat. No. 7,838,854, from application Ser. No. 11/067,124 filed on Feb. 25, 2005, entitled METHOD AND APPARATUS FOR EUV PLASMA SOURCE TARGET DELIVERY, U.S. Pat. No. 7,589,337 from application Ser. No. 12/075,631 filed on Mar. 12, 2008, entitled LPP EUV PLASMA SOURCE MATERIAL TARGET DELIVERY SYSTEM, U.S. patent application Ser. No. 11/358,983 filed on Feb. 21, 2006, and entitled, SOURCE MATERIAL DISPENSER FOR EUV LIGHT SOURCE, the entire contents of each of which are hereby incorporated by reference herein. An example of non-modulating droplet dispenser can be found in co-pending U.S. patent application Ser. No. 11/358,988 filed on Feb. 21, 2006, and entitled, LASER PRODUCED PLASMA EUV LIGHT SOURCE WITH PRE-PULSE, the entire contents of each of which are hereby incorporated by reference herein.

Figure 3A:
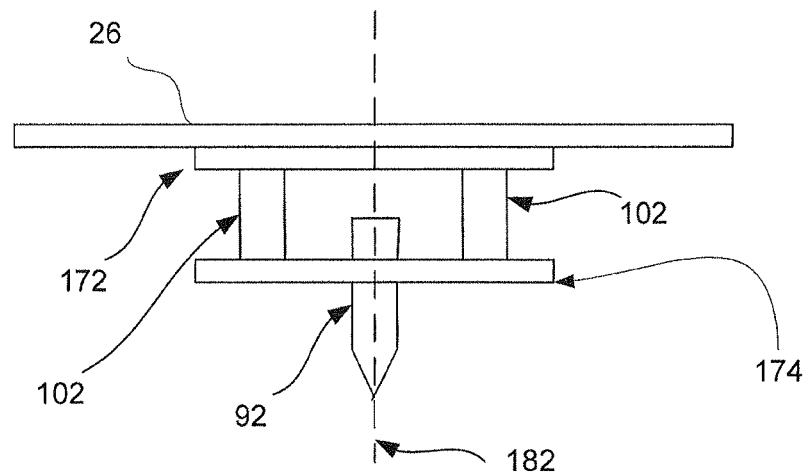
FIGS. 3A and 3B are conceptual diagrams of a droplet generator and a steering system for the droplet generator.
Figure 3B:
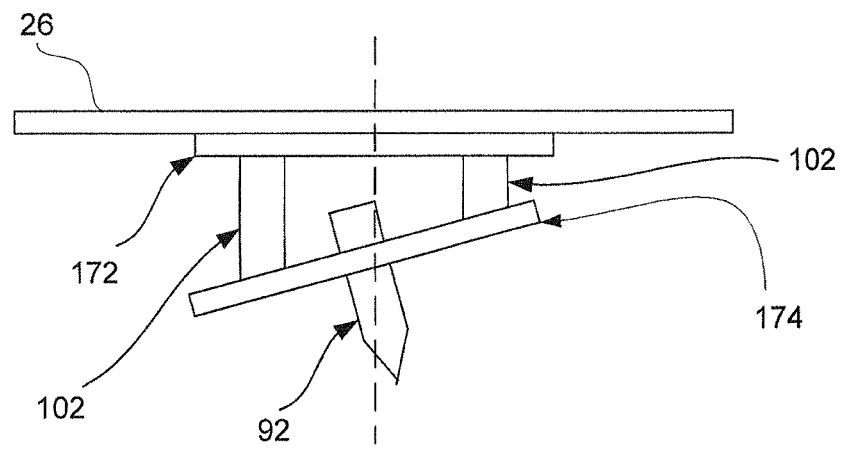

As shown in FIGS. 3A and 3B, the target delivery mechanism 92 can be mounted on a steering mechanism 170 capable of tilting the target delivery mechanism 92 in different directions to adjust the release point of the droplets and so to reposition the point at which the droplet generator releases droplets thus to control the path the droplets will take into the irradiation region 28. Although in the highly conceptual representation of FIGS. 3A and 3B the tilt is in the plane of the figure, one of ordinary skill in the art will readily appreciate that the tilt may in fact be in any direction. The present specification refers to this process as "steering" the droplet generator. In applications where such steering is desirable, it is clear that the droplet generator must be movable with respect to the other components and reference points in the system, and, in particular, the irradiation region 28 and that a mechanical coupling system 102 must be interposed between the droplet generator and the other components of the system so as to allow for such movement.

Proper steering of the droplet generator (and, hence, of the droplets it generates) requires a coupling system that is highly precise and repeatable and which exhibits a low amount of hysteresis. It is also preferable that the coupling be very responsive, i.e., have a high bandwidth. As mentioned, the coupling preferably meets these requirements despite manipulating a relatively massive load, that is, the droplet generator 92, which can typically weigh on the order of 30 kg.

According to the present embodiment, a coupling capable of having these attributes is realized in the form of a device having a fixed member 172 fixedly coupled to a stationary element in the system such as a wall of chamber 26 and a movable member 174 coupled to the target delivery mechanism (droplet generator) 92. The fixed member 172 and the movable member 174 are in turn coupled by a coupling system 176. The coupling system 176 preferably includes a first coupling subsystem 178 (elements 178a, 178b, and 178c) that reduces or eliminates any relative translational (e.g. sliding) motion of the movable member 174 relative to the fixed member 172 as well as relative rotations of the movable member 174 relative to the fixed member 172 around the device axis, while at the same time allowing the movable member 174 to tilt with respect to the fixed member 172. Stated another way, taking a three-dimensional cartesian coordinate system with the x and y axes lying in the plane of a substantially planar plate-like fixed member 172 and the z axis 182 passing through the release point of the target delivery mechanism (droplet generator) 92 when the release point is in a neutral (zero tilt) position as shown in FIG. 3A, the first coupling subsystem restrains translation in the x and y directions and rotation about the z axis.

It will be understood by one of ordinary skill in the art that the terms "plate" and as used herein simply refer to a structural element to which other elements may be connected, such as a base or a frame, and is not limited to structural elements that are necessarily flat or substantially planar.

The coupling system 176 also preferably includes a second coupling subsystem 180 (elements 180a, 180b, and 180c in FIG. 4) that includes one or linear combinations of coupling elements and motor elements coupling the fixed member 172 and the movable member 174 and providing a force having a tendency to tilt the movable member 174 with respect to the fixed member 172. The motor elements may be any element that produces a force, including but not limited to linear motors, stepper motors, piezoelectric actuators, or some combination of these. As mentioned, the first coupling subsystem 178 and second coupling subsystem 180 are configured to cooperate to permit relative tilting or inclination of the fixed member 172 and the movable member 174. Because the target delivery mechanism 92 is preferably rigidly coupled to the movable member 174, tilting the movable member 174 with respect to the fixed member 172 steers the target delivery mechanism 92, that is, alters the position of the droplet generator release point. This is shown in FIG. 3B.

Figure 4:
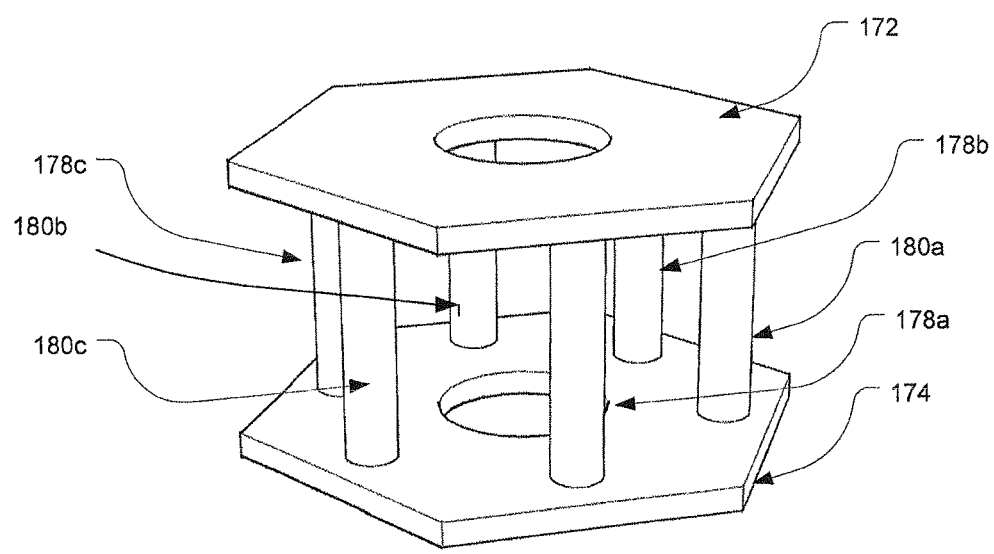
FIG. 4 is a conceptual diagram of an embodiment of a steering system for a droplet generator according to one aspect of the invention.

FIG. 4 is another conceptual representation of steering system according to another aspect of the invention. As depicted there, the steering system has a first coupling subsystem 178 made up of coupling elements 178a, 178b, and 178c arranged at corresponding locations around the respective peripheries of fixed member 172 and the movable member 174. The first coupling subsystem 178 in the arrangement of FIG. 4 has three coupling elements, but it will be apparent to one having ordinary skill in the art that other numbers of coupling elements could be used. Also in the arrangement of FIG. 4 the coupling elements 178a, 178b, and 178c are positioned symmetrically. In the particular arrangement of FIG. 4 they are positioned with 120 degree rotational symmetry about a central axis of the device (a line passing through the centers of the two circular apertures which accommodate the droplet generator.) It will be apparent to one having ordinary skill in the art that if a symmetric arrangement is used, other symmetries could be followed.

Also in FIG. 4, the steering system has a second coupling subsystem 180 made up of coupling elements 180a, 180b, and 180c arranged at corresponding locations around the respective peripheries of fixed member 172 and the movable member 174. The second coupling subsystem 180 in the arrangement of FIG. 4 has three coupling elements, but it will be apparent to one having ordinary skill in the art that other numbers of coupling elements could be used. Also in the arrangement of FIG. 4 the coupling elements 180a, 180b, and 180c are positioned symmetrically. In the particular arrangement of FIG. 4 they are positioned with 120 degree rotational symmetry about a central axis of the device (a line passing through the centers of the two circular apertures.) It will be apparent to one having ordinary skill in the art that if a symmetric arrangement is used, other symmetries could be followed. In the arrangement of FIG. 4 the positions of the coupling elements of the second coupling subsystem 180 alternate with the coupling elements of the first coupling subsystem 178 around the periphery of the fixed member 172 and the movable member 174.

As mentioned, the coupling system 176, which includes the first coupling subsystem 178 and the second coupling subsystem 180, serves at least two functions. One function is to restrain certain types of relative movements between the fixed member 172 and the movable member 174, such as a sliding or translational movement, while at the same time permitting a tilting motion. Another function is to cause a tilting motion between the two plates. One advantage of the present invention is that these two functions can be carried out by two separate subsystems. For example, the first coupling subsystem 178 can perform the function of permitting tilting while restraining other kinds of motions. The second coupling subsystem 180 can perform the function of inducing a tilting motion. This permits each of the two subsystems to be designed in such a way as to optimize its performance of its respective function without the need to address constraints that would otherwise be imposed by having the same coupling subsystem perform both functions.

According to another aspect of the present invention, the first and second coupling subsystems employ flexures as coupling elements. One of ordinary skill in the art will appreciate that some connectors used to mechanically couple one structural element to another use rigid parts that mechanically mate with one another. Hinges, sliders, universal joints, and ball-and-socket joints are examples of this type of rigid connector or coupling. Such connectors permit a variety of kinematic degrees of freedom between the parts they connect. They suffer from the disadvantage, however, that the clearance between mating parts of these rigid joints can introduce positional error caused by backlash, that is, motion lost to clearance when a driving direction is reversed and contact between mating surfaces must be reestablished before relative motion continues. Further, operation of these connectors necessarily involves relative motion of their parts causing friction that leads to wear and undesirably increased clearances. A kinematic chain of such connectors results in an aggregation of individual errors from backlash and wear, resulting in limited accuracy and repeatability.

For some applications, the problems associated with rigid connectors can be avoided or overcome by the use of so-called flexures. Flexures are also known as by a variety of names including flexible joints, flexible couplings, flexure pivots, flex connectors, living joints, and compliant joints. Unlike the rigid couplings described above, flexible joints generally are not comprised of rigid elements having a clearance between them. Rather flexures utilize the inherent compliance of a material under deformation. Flexures thus eliminate friction, backlash, and wear. This permits excellent accuracy and repeatability. In addition, making the flexure from a unitary monolithic material can simplify production and facilitate low-cost fabrication.

In one aspect, the present invention provides a high bandwidth, high-precision, high-stiffness, hysteresis-free steering system for an EUV droplet generator through the use of flexures that are flexible enough to provide the required range of motion yet strong enough to be compatible with the preload forces required to achieve the needed stiffness. At the same time, it permits fabrication of a steering system that is not so massive as to reduce system resonance frequencies which would be undesirable in the context of steering the droplet generator.

In another aspect, the invention uses two or more coupling subsystems each of which uses flexures to remove unwanted degrees of freedom while providing the required stiffness (or, equivalently, a sufficiently high mechanical resonance frequency).

Figure 5:
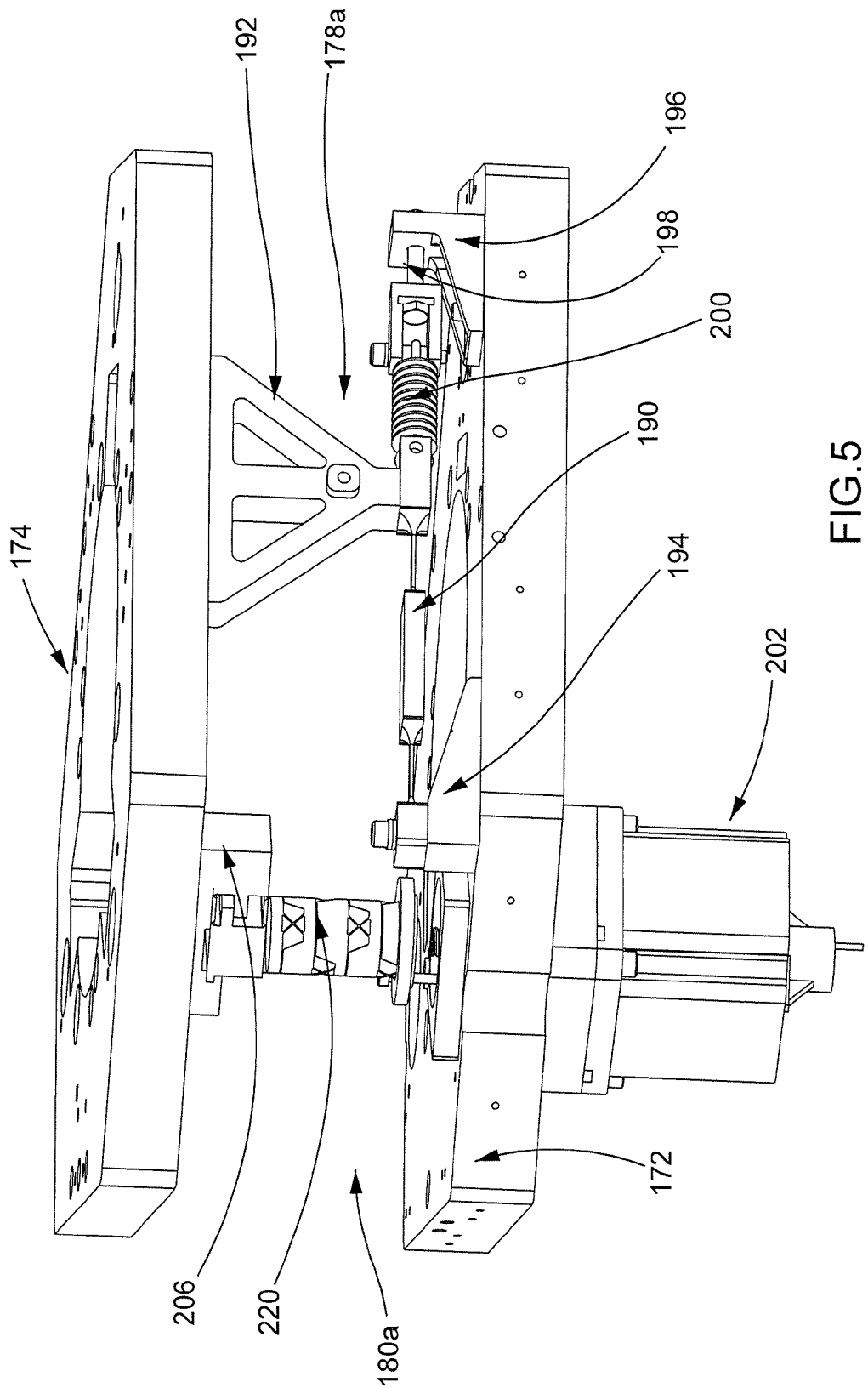
FIG. 5 is a perspective view of an embodiment of a steering system for a droplet generator according to one aspect of the invention.

According to this aspect of the invention, the first coupling subsystem 178 includes two or more, and preferably three, coupling elements, each of which includes a first flexure element 190. In the embodiment shown in FIG. 5, the first flexure element 190 is a "string flexure." FIG. 5 shows only one first coupling subsystem element 178a for purposes of clear presentation but one of ordinary skill in the art will readily appreciate that additional first coupling subsystem elements may be present as suggested by FIG. 4. In systems where the fixed member 172 and the movable member 174 are configured as substantially parallel plates, the first flexure element 190 is oriented approximately parallel to the stationary plate and the movable plate. This is shown in FIG. 5, where the first coupling subsystem 178 is made up of a first flexure element 190 one end of which is coupled to a triangular strut member 192. The triangular strut member 192 is fixed to the movable member 174. The other end of the first flexure element 190 is connected to a bracket 194 which is in turn attached to the fixed member 172. In addition, the end of the first flexure element 190 attached to the triangular strut member 192 is also attached to a bracket 196 which is in turn attached to the fixed member 172. The first flexure element 190 is attached to the bracket 196 through a joint arrangement 198 which allows for two degrees of freedom and through a spring 200 that pre-loads the first flexure element 190. The first coupling subsystem 178 provides a stiff connection between the fixed member 172 and the movable member 174 by limiting or even substantially eliminating translation, i.e., parallel sliding of the two plates with respect to each other, as well as rotations in the plane parallel to the plates. At the same time, the first coupling subsystem 178 allows for relative tilt of the plates with respect to each other.

The second coupling subsystem 180 is preferably made up of two or more series combinations of flexures and one or more motive devices. Here and elsewhere in this specification the term "series combination" is intended to refer to a linear configuration in which the elements are arranged in an ordered series, each to the next, so that their overall effect is essentially additive. Also, the term "motive device" is intended to refer to any device capable of generating a motive force and includes without limitation linear motors, linear actuators, stepping motors, and piezoelectric elements.

In a particular configuration each coupling element of the second coupling subsystem 180 includes a linear combinations of elements. Again, FIG. 5 shows only one second coupling subsystem element 180a for purposes of clear presentation but one of ordinary skill in the art will readily appreciate that additional second coupling subsystem elements may be present as suggested by FIG. 4. As shown in FIG. 5 the second coupling subsystem element 180a may include a linear motor 202, a second flexure element 204, a third flexure element 206, and a piezoelectric actuator 208 (atop the second flexure element 206; occluded by movable member 174 in FIG. 5 but visible in FIG. 10). This is one possible configuration. It will be readily appreciated by one of ordinary skill in the art that other elements could be used or that the same or other elements could be used in a different order. In the configuration shown in FIG. 5, the linear motor 202 is rigidly coupled to the fixed member 172 and the piezoelectric actuator 208 is rigidly coupled to the movable member 174 to provide for coarse and fine motion, respectively. The linear motor 202 is mechanically connected to the piezoelectric actuator 208 through the second and third flexure elements 204, 206. In a particular embodiment, the second flexure element 204 may be a so-called "cartwheel" flexure as shown and described more fully below. The third flexure element 206 may be a "double" or "parallelogram" flexure as shown and described more fully below.

The second coupling subsystem 180 allows control of x and y rotation and z translation of the movable member 174 relative to the fixed member 172. The second flexure element 204 allows some lateral relative movement of the movable member 174 relative to the fixed member 172, such that the motion can be pivoting about a fixed point in space which is near the axis of the device but below the fixed member 172 (i.e. towards the release point of droplet generator). At the same time the second flexure element 204 provides stiffness against translations along the long (z) axis of the droplet generator and allow for small misalignments between the linear motor 202 and the movable member 174.

The third flexure element 206 allows the piezoelectric actuator 208 to exert a force on the movable member 174 without applying any lateral moment to the piezoelectric actuator 208. This is preferred for piezoelectric transducers because of their relative brittleness.

It will be appreciated that the specific materials, dimensions, and forms of the first flexure element 190 and the second flexure element 204, and the third flexure element 204 are preferably chosen for the three types of flexures so that the desired range of motion can be achieved while meeting stiffness and fatigue stress requirements.

Figure 6A:
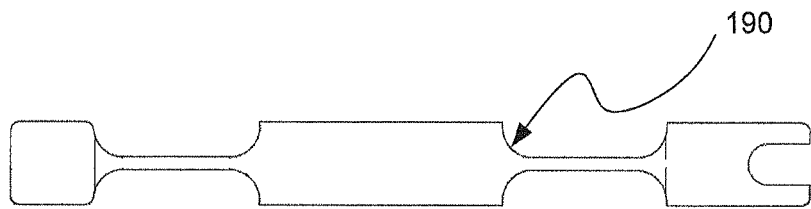
FIGS. 6A-6C are front, top, and and isometric views, respectively, of a flexure element which could be used according to one embodiment of a steering system for a droplet generator according to one aspect of the invention.
Figure 6B:
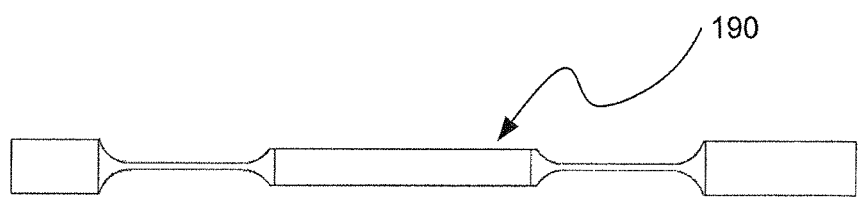
Figure 6C:
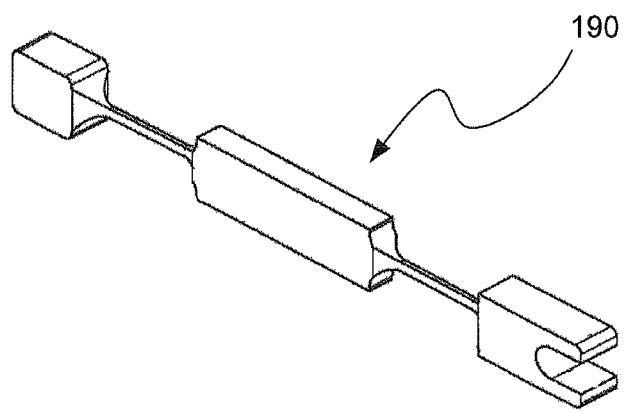

For example, when a string flexure is used as the first flexure element 190 it may be configured as shown in FIGS. 6A, 6B, and 6C. As can be seen, the first flexure element of these figures has two narrowed portions to permit flexing side-to-side or up-and-down. The overall dimensions of the first flexure element 190 will vary according to the specific application. One of a number of materials could be used to make the first flexure element 190. As one example, the first flexure element 190 could be made of heat treated stainless steel.

Figure 7A:
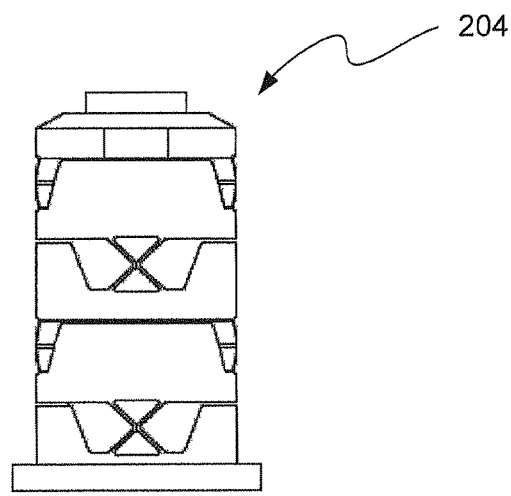
FIGS. 7A and 7B are front and isometric views, respectively, of a second type of flexure element which could be used according to one embodiment of a steering system for a droplet generator according to one aspect of the invention.
Figure 7B:
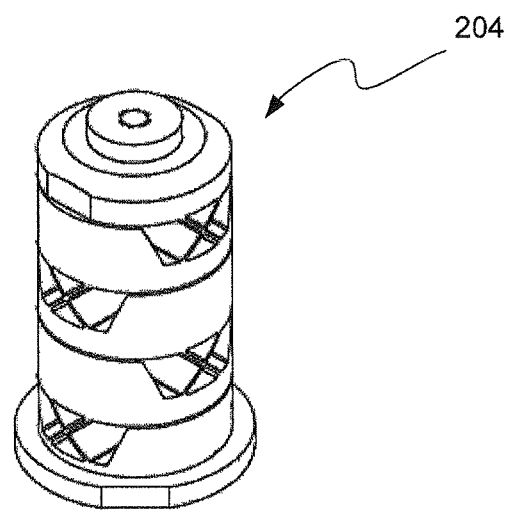

As an additional example, when a cartwheel flexure is used as the second flexure element 204 it may be configured as shown in FIGS. 7A and 7B. As can be seen, the second flexure element 204 of these figures has two flexible leaves intersecting at their mid points. The example in FIGS. 7A and 7B shows a second flexure element 204 made up of three sections, each of which comprises a cartwheel flexure, but one of ordinary skill in the art will readily appreciate that one, two, or some other number of sections can be used. The overall dimensions of the second flexure element 204 will vary according to the specific application. One of a number of materials could be used to make the second flexure element 204. As one example, the second flexure element 204 could be made of stainless steel.

Figure 8A:
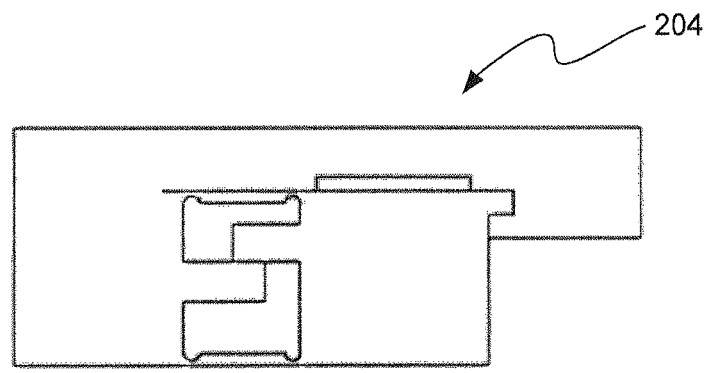
FIGS. 8A and 8B are front and isometric views, respectively, of a third type of flexure element which could be used according to one embodiment of a steering system for a droplet generator according to one aspect of the invention.
Figure 8B:
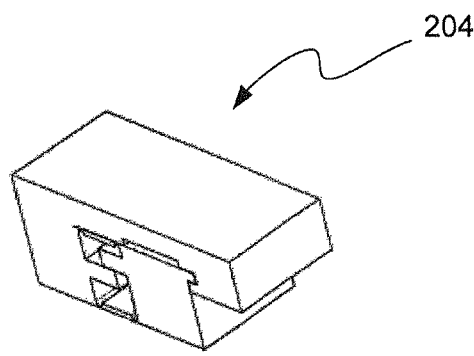

As a third example, when a parallelogram flexure is used as the third flexure element 206 it may be configured as shown in FIGS. 8A and 8B. As can be seen, the third flexure element 206 of these figures is generally box shaped with a lower portion of the box serving as a platform and the upper part of the box serving as a cantilevered beam. The platform and beam are integral with one another and also interact through a series of internal ridges and gaps which permit the cantilevered beam to flex in a direction corresponding to up and down in the figure. The example in FIGS. 8A and 8B shows a particular configuration for third flexure element 206 but one of ordinary skill in the art will readily appreciate other flexure configurations can be used. The overall dimensions of the third flexure element 206 will vary according to the specific application. One of a number of materials could be used to make the third flexure element 206. As one example, the third flexure element 206 could be made of heat treated stainless steel.

Figure 9:
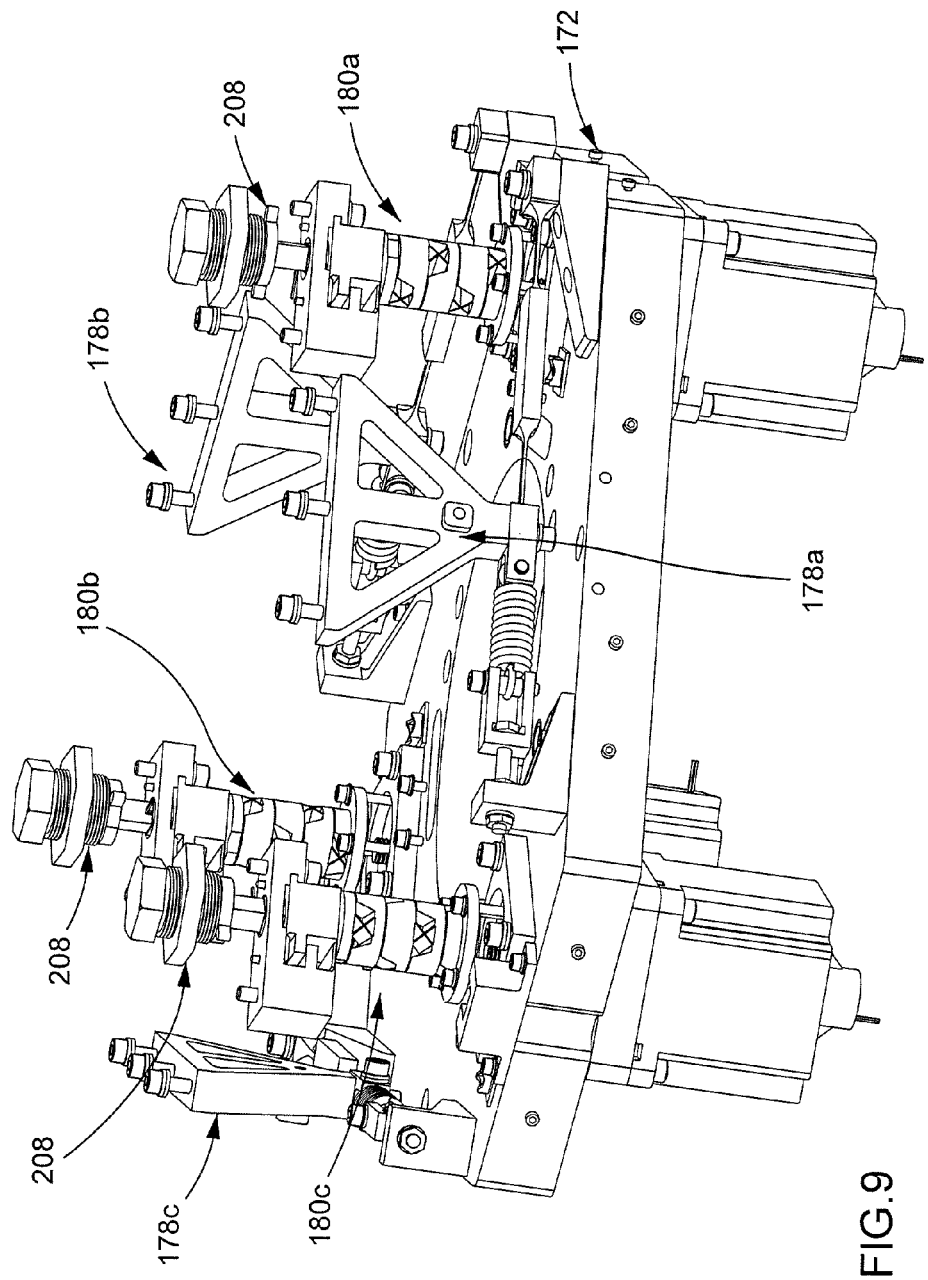
FIG. 9 is a perspective view of an embodiment of a steering system for a droplet generator according to one aspect of the invention shown in FIG. 5 with similar components repeated and one component removed to make hidden components more visible.

FIG. 9 shows an embodiment of a droplet generator according to the invention where the first coupling subsystem 178 is depicted as including coupling elements 178a, 178b, and 178c arranged at corresponding locations around the respective periphery of fixed member 172 (the movable member 174 being omitted from the drawing to make the piezoelectric actuator 208 more visible. The first coupling subsystem 178 in the arrangement of FIG. 9 has three coupling elements, but it will be apparent to one having ordinary skill in the art that other numbers of coupling elements could be used. Also in the arrangement of FIG. 9 the coupling elements 178a, 178b, and 178c are positioned symmetrically. In the particular arrangement of FIG. 9 they are positioned with 120 degree rotational symmetry about a central axis of the device (a line passing through the centers of the two circular apertures which accommodate the droplet generator.) It will be apparent to one having ordinary skill in the art that if a symmetric arrangement is used, other symmetries could be followed. Also, each coupling element is depicted as including a first flexure element 190 connected as described in connection with FIG. 5.

The embodiment depicted in FIG. 9 also includes shows an embodiment of a droplet generator according to the invention that includes a second coupling subsystem 180 made up of coupling elements 180a, 180b, and 180c arranged at corresponding locations around the respective periphery of fixed member 172. The second coupling subsystem 180 in the arrangement of FIG. 9 has three coupling elements, but it will be apparent to one having ordinary skill in the art that other numbers of coupling elements could be used. Also in the arrangement of FIG. 9 the coupling elements 180a, 180b, and 180c are positioned symmetrically. In the particular arrangement of FIG. 9 they are positioned with 120 degree rotational symmetry about a central axis of the device (a line passing through the centers of the two circular apertures.) It will be apparent to one having ordinary skill in the art that if a symmetric arrangement is used, other symmetries could be followed. In the arrangement of FIG. 9 the positions of the coupling elements of the second coupling subsystem 180 alternate with the coupling elements of the first coupling subsystem 178 around the periphery of the fixed member 172. Also, each coupling element is depicted as including a linear motor, second flexure element, third flexure element, and piezoelectric actuator 208 connected as described in connection with FIG. 5.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. Apparatus comprising:
a first member adapted to be coupled to a frame;
a second member;
an EUV target material dispenser mechanically coupled to the second member and adapted to dispense an EUV target material; and
a coupling system mechanically coupling the first member to the second member, wherein the coupling system comprises a first coupling subsystem configured to constrain translational movement of the second member with respect to the first member while permitting tilting movement of the second member with respect to the first member, and a second coupling subsystem adapted to control an amount of tilting of the second member with respect to the first member and so to affect a position of a release point of EUV target material from the EUV target material dispenser, the first coupling subsystem comprising a plurality of first coupling subsystem elements mechanically coupling said first member to said second member, each of said first coupling subsystem elements comprising at least one flexure.

2. Apparatus as claimed in claim 1 wherein said first member is substantially plate shaped.

3. Apparatus as claimed in claim 1 wherein said first member is substantially plate-shaped, and wherein said second member is substantially plate shaped.

4. Apparatus as claimed in claim 1 wherein the second coupling subsystem comprises a plurality of second coupling subsystem elements mechanically coupling said first member to said second member.

5. Apparatus as claimed in claim 4 wherein each of said second coupling subsystem elements comprises at least one first flexure.

6. Apparatus as claimed in claim 5 wherein said at least one first flexure is a cartwheel flexure.

7. Apparatus as claimed in claim 5 wherein each of said second coupling subsystem elements comprises at least one second flexure coupled to said at least one first flexure.

8. Apparatus as claimed in claim 7 wherein said at least one second flexure is a parallelogram flexure.

9. Apparatus comprising:
a first member adapted to be coupled to a frame;
a second member;
an EUV target material dispenser mechanically coupled to the second member; and
a coupling system mechanically coupling the first member to the second member, wherein the coupling system comprises a first coupling subsystem configured to constrain translational movement of the second member with respect to the first member while permitting tilting movement of the second member with respect to the first member, and a second coupling subsystem adapted to control an amount of tilting of the second member with respect to the first member and so to affect a position of a release point of EUV target material from the EUV target material dispenser,
wherein each of said second coupling subsystem elements comprises at least one first flexure and at least one linear motor coupled to said first member and to said first flexure.

10. Apparatus as claimed in claim 9 wherein each of said second coupling subsystem elements comprises at least one second flexure coupled to said at least one first flexure.

11. Apparatus as claimed in claim 10 wherein each of second coupling subsystem elements comprises at least piezoelectric element coupled to said second member and to said at least one second flexure.

12. Apparatus comprising:
a plate-shaped first member adapted to a coupled to a frame;
a plate-shaped second member;
a dispenser mechanically coupled to the second member and adapted to dispense an EUV target material; and
a coupling system mechanically coupling the first member to the second member, wherein the coupling system comprises
a first coupling subsystem configured to constrain translational movement of the second member with respect to the first member while permitting tilting movement of the second member with respect to the first member, said first coupling subsystem including a plurality of first coupling subsystem elements, each of said first coupling subsystem elements comprising at least one flexure, and
a second coupling subsystem adapted to control an amount of tilting of the second member with respect to the first member,
said first coupling subsystem including a plurality of first coupling subsystem elements, each of said first coupling subsystem elements comprising at a linear combination of a stepper motor coupled to said first member, a first flexure coupled to said stepper motor, a second flexure coupled to said first flexure, and a piezoelectric actuator coupled to said second flexure and to said second member.

13. Apparatus comprising:
a first member adapted to be coupled to a frame;
a second member;
an EUV target material dispenser mechanically coupled to the second member, a relative position of the first member and the second member affecting a position of a release point of EUV target material from the EUV target material dispenser; and
a coupling system mechanically coupling the first member to the second member, wherein the coupling system comprises at least one flexure.

14. Apparatus comprising:
a first member adapted to be coupled to a frame;
a second member;
an EUV target material dispenser mechanically coupled to the second member and adapted to dispense an EUV target material from a release point, the first member and the second member having a common axis passing through the release point and substantially perpendicular to the first member and the second member when the second member is in a first position with respect to the first member; and
a coupling system mechanically coupling the first member to the second member, wherein the coupling system comprises a first coupling subsystem configured to constrain lateral movement of the second member with respect to the first member while permitting rotation of the second member such that the release point is not on the axis, the coupling system comprising a plurality of coupling system elements mechanically coupling said first member to said second member, each of said coupling system elements comprising at least one flexure; and
a second coupling subsystem adapted to control rotation of the second member.

15. Apparatus as claimed in claim 1 wherein the EUV target material dispenser is a droplet generator adapted to dispense EUV target material in droplet form.

16. Apparatus as claimed in claim 12 wherein the dispenser is a droplet generator.

17. Apparatus as claimed in claim 13 wherein the EUV target material dispenser is a droplet generator adapted to dispense EUV target material in droplet form.

18. Apparatus as claimed in claim 14 wherein the EUV target material dispenser is a droplet generator adapted to dispense EUV target material in droplet form.

* * * * *